United States Patent [19]

Breno

[11] 4,209,488
[45] Jun. 24, 1980

[54] FLUID COLLECTION APPARATUS
[75] Inventor: Philip J. Breno, Oregon, Ohio
[73] Assignee: Owens-Illinois, Inc., Toledo, Ohio
[21] Appl. No.: 949,847
[22] Filed: Oct. 10, 1978
[51] Int. Cl.[2] .......................... B01D 33/00; B01L 3/00
[52] U.S. Cl. ................................. 422/101; 141/330;
210/359; 210/444; 210/DIG. 23
[58] Field of Search .............. 422/101; 210/359, 444,
210/DIG. 23; 128/2 F, 272, DIG. 5; 141/327,
330

[56] References Cited
U.S. PATENT DOCUMENTS

| | | | |
|---|---|---|---|
| 3,512,940 | 5/1970 | Shapiro | 422/101 |
| 3,586,064 | 6/1971 | Brown et al. | 141/330 X |
| 3,661,265 | 5/1972 | Greenspan | 210/359 |
| 3,687,296 | 8/1972 | Spinosa et al. | 128/2 F X |
| 3,693,804 | 9/1972 | Grover | 210/359 |
| 3,837,376 | 9/1974 | Brown et al. | 141/330 X |
| 3,850,174 | 11/1974 | Ayres | 128/272 |
| 3,875,012 | 4/1975 | Dorn et al. | 210/DIG. 23 X |
| 3,931,815 | 1/1976 | Takatsuki | 128/2 F |
| 3,954,614 | 5/1976 | Wright | 210/359 X |
| 3,983,037 | 9/1976 | Lee et al. | 210/DIG. 23 X |
| 4,057,499 | 11/1977 | Buono | 210/359 X |

Primary Examiner—Joseph Scovronek
Attorney, Agent, or Firm—John R. Nelson; David H. Wilson; Myron E. Click

[57] ABSTRACT

A fluid collection apparatus is disclosed which is useful in separating blood serum or plasma from blood cellular and particulate matter. The apparatus comprises an elongated hollow body closeable at both ends with a self sealing septum near one end. The septum includes a central cavity extending axially from one end of the septum and terminates in a web portion. The septal web portion is pierced by a composite piston member which includes a passageway equipped with a filter. Fluid, therefore, flows through the filter, the piercing means and into the hollow body. A flange on the composite piston extends laterally of the hollow body and sealingly engages the inner wall of a tube filled with a sample of mixed materials.

Upon withdrawal of the apparatus, the composite piston remains sealed in the sample containing tube. The web portion of the hollow body reseals on withdrawal of the piercing means to prevent leakage. The uncontaminated, self-sealed, hollow body-septum portion of the apparatus may be capped for shipment.

15 Claims, 7 Drawing Figures

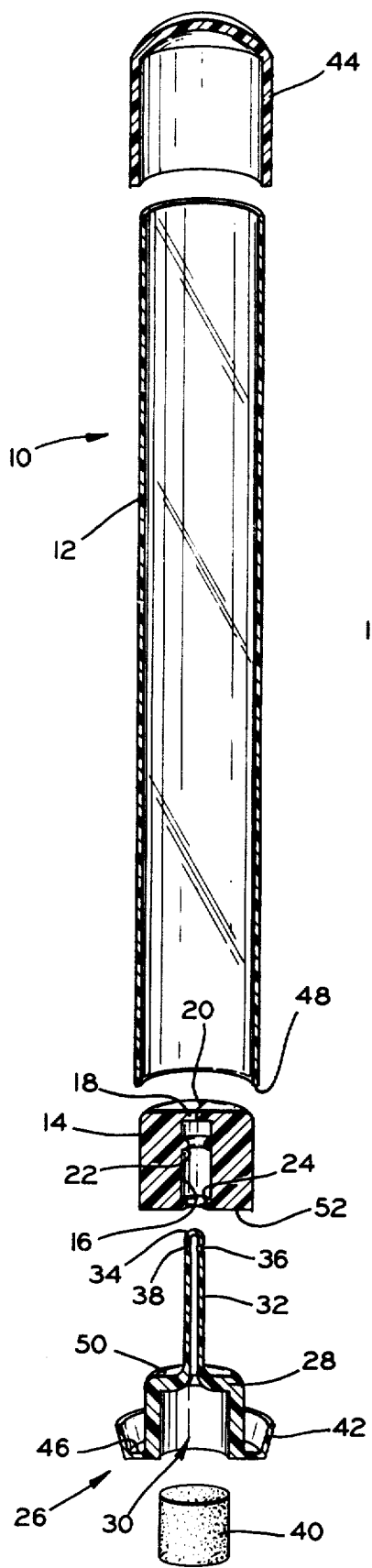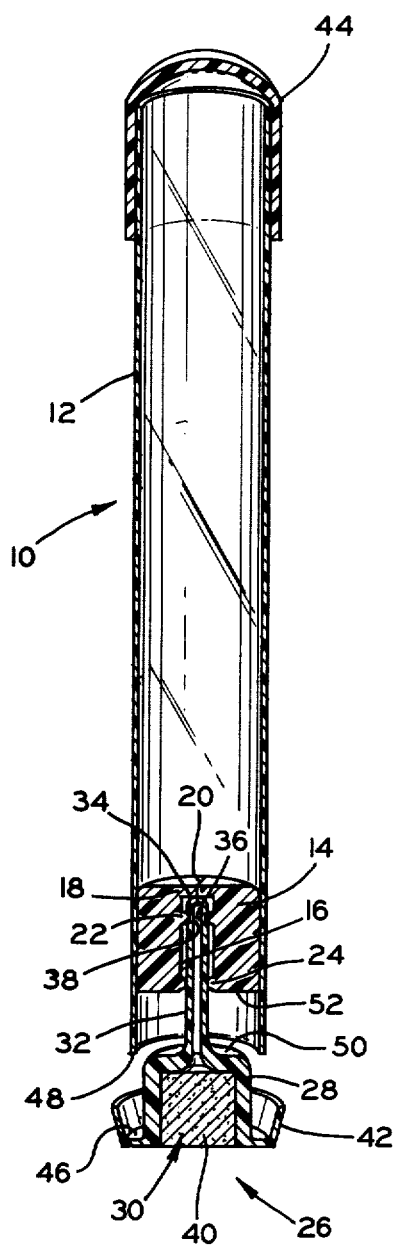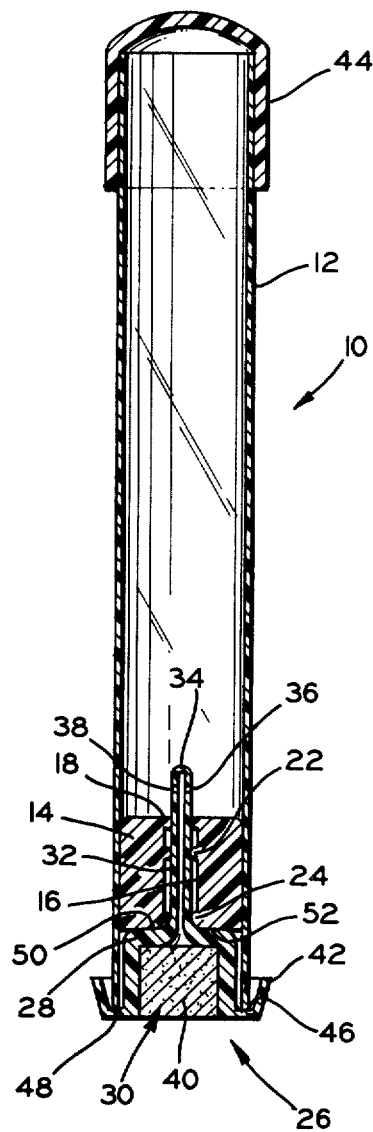
FIG. 1
FIG. 2
FIG. 3

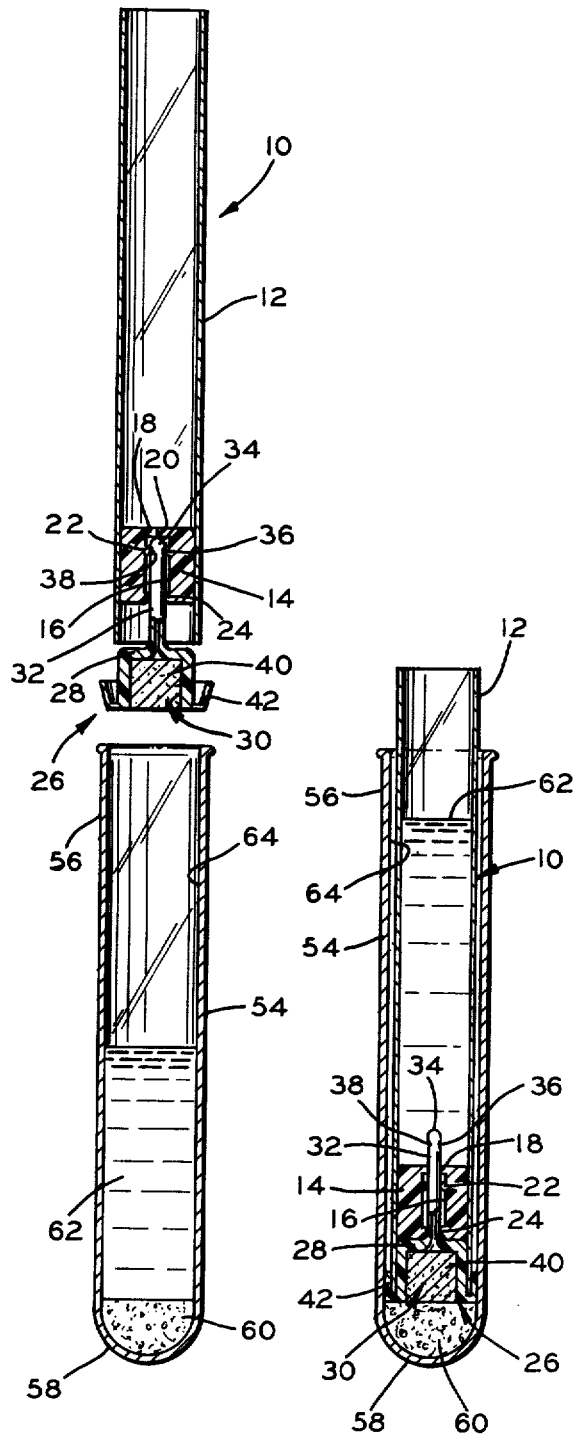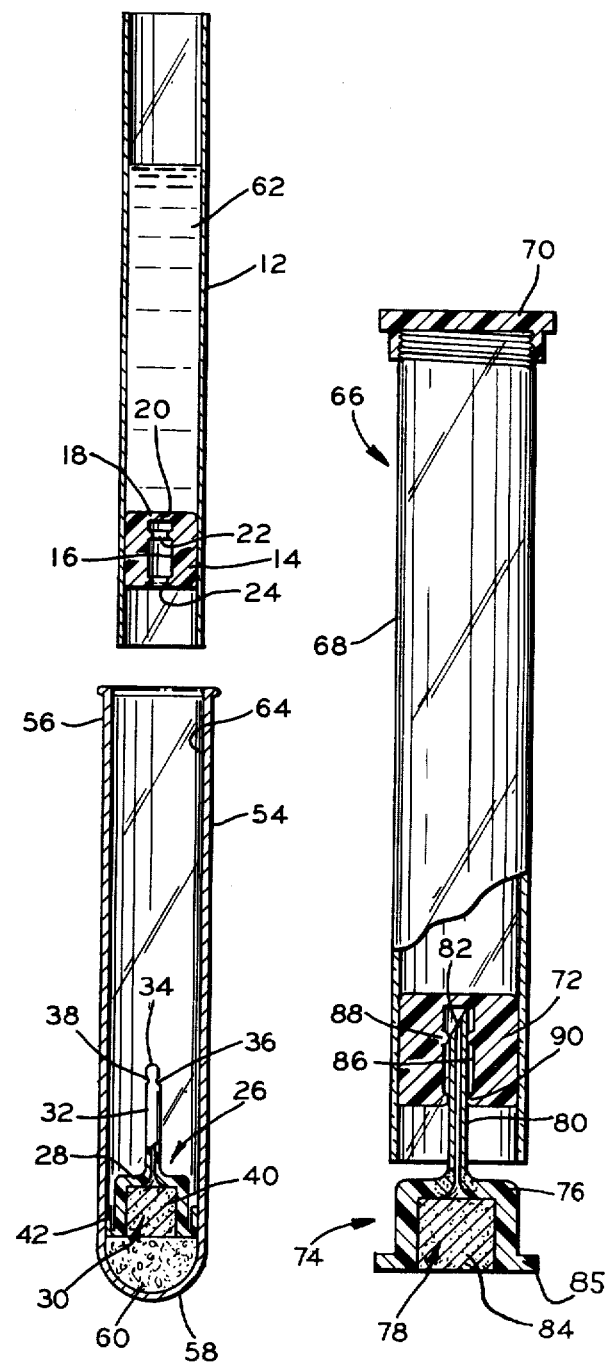
FIG. 4a  FIG. 4b  FIG. 4c  FIG. 5

FLUID COLLECTION APPARATUS

CROSS-REFERENCE TO RELATED APPLICATION

This application is related to the subject matter of U.S. patent application Ser. No. 901,948 filed May 1, 1978.

BACKGROUND OF THE INVENTION

1. Field of the Invention

The present invention relates to an apparatus for the separation of mixtures and is particularly useful in separating a fluid from a solid or semisolid contained therein. The apparatus is well suited for the separation of blood plasma or serum from the blood cellular and particular matter phase. In many laboratory and clinical situations, it is desired to separate a solid or semisolid fraction of a mixture from a liquid fraction of the mixture. This may be accomplished in a number of fashions, with one of the most efficient being the use of an apparatus which is inserted into a sample containing tube to physically separate the liquid from the solid fraction of the mixture. The present invention provides such an apparatus which is capable of separating the liquid from the solid fraction of a mixture by the insertion of the apparatus into a sample containing tube. After the separation has been effected, a portion of the apparatus is withdrawn from the sample containing tube as a contamination free, shippable container having the sample of the liquid collected contained therein. Remaining behind in the collection tube is the piston member which effectively seals the sample containing tube, providing a contamination free, sealed disposal means for the contaminating solid contained in the sample containing tube.

2. Description of the Prior Art

As is well known, the market place is replete with fluid separators, many of which are adapted to specialized purposes and useable only for those purposes.

U.S. Pat. No. 3,586,064 shows an apparatus for the collection of blood wherein a hollow central body is closed at both ends by piercable elastomeric seals. The seals are pierced by respective needles, so that when the device is inserted into a collection tube, one of the needles allows the liquid to flow into the interior of the hollow tube, while the other needle provides a vent to atmosphere. When sufficient sample has been collected, the atmosphere vent needle is withdrawn and the septum seals itself. Thereafter, the apparatus is withdrawn from the collection tube and the second needle is withdrawn, providing a self-sealing container for the collected sample.

U.S. Pat. No. 3,837,376 shows a similar apparatus wherein both ends of the collecting apparatus are exposed to the atmosphere while the liquid sample is being forced into the collection apparatus, but in this case, only one needle is used whereby the needle has two vents to be disposed within the interior of the collection apparatus. During the collection operation, liquid flows from the sample containing tube through the needle, into the hollow body through the lower one of the two vents. After the fluid has been collected in the lower portion of the collection apparatus, both ports are again free of fluid and atmospheric communication through the needle vents is established with the interior of the sample containing tube. This facilitates the removal of the collection apparatus from the sample containing tube without interference of so-called vacuum lock problems.

A similar device is shown in U.S. Pat. No. 3,983,037 wherein a flexible walled hollow tube, closed at both ends, is penetrated at one end by a needle-like structure. The end of the needle-like structure which terminates inside the collection apparatus is attached to a filter so that fluid passing through the needle-like structure from the sample containing tube is filtered before it passes into the interior of the collection apparatus. To employ this device, the collection apparatus is compressed to form a partial vacuum on the interior. The needle-like portion protruding from the closed end of the collection apparatus is inserted under the surface of the fluid to be collected, and the pressure on the collection apparatus is released, thereby causing the fluid in the sample containing tube to be drawn up into the needle, passed through the filter, and be collected on the interior of the collection apparatus.

U.S. Pat. No. 3,693,804 shows a pressure differential sampling device wherein the collection apparatus consists of a hollow body portion having one end closed by a piston filter assembly wherein a filter is fitted within a piston structure, and the piston filter structure is fitted within the hollow body of the collection apparatus. To employ the device, the assembly is forced into a sample containing tube so that the liquid is forced through the filter device into the interior of the hollow body portion of the collection apparatus. When sufficient sample has been collected, the collection apparatus is tilted sharply within the sample containing tube to break the seal therebetween and allow withdrawal of the entire apparatus.

In a similar device, U.S. Pat. No. 4,057,499, shows a flood collection apparatus comprising a hollow body tube having a piston member inserted into one end thereof. The piston member is generally bell-shaped with the narrowest portion of the bell structure being inserted into the hollow body member. The piston contains a filter member through which passes fluid to be collected. In the upper end of the bell-shaped piston member is a one-way valve which allows the fluid to flow through the filter material and into the interior of the hollow body member of the collection apparatus. The composite piston member has a laterally extending flange which sealingly engages the interior wall of the sample containing tube while the collection apparatus is being forced into the sample tube to collect the fluid contained therein. Upon withdrawal of the entire collection apparatus, the flange of the piston folds over itself so that an upper radially grooved portion of the flange moves from its up position into a downward position, thereby breaking the seal between the flange member and the interior walls of the sample containing tube.

Many other related fluid collection devices are known; for example, U.S. Pat. Nos. 3,687,296; 3,850,174; 3,875,012; and 3,931,815.

SUMMARY OF THE INVENTION

A number of problems have been evident in these prior art devices. One of the major problems is that when the collection apparatus is withdrawn from the sample containing tube, the bottom of the collection apparatus is contaminated with the material contained in the tube. This material, especially in medical circumstances, may contain pathogens or toxins which should not be exposed to the laboratory environment. Additionally, another major problem exists in that the removal of the collection apparatus leaves an open sample containing tube which is similarly disadvantageous from a contamination or spillage standpoint in a laboratory. Another problem that is evident is that many devices allow a needle-like structure to pierce a septum portion of the device for long periods of time. The elastomeric material of the septum can assume a compression set or memory such that when the needle-like structure is removed from the septum the elastomeric material will not return to the completely closed position that it exhibited before being pierced by the needle-like structure. This may cause a problem in regard to any fluid material stored within the device which may leak out of the loosely closed septum after the piercing needle-like structure is withdrawn from the septum.

The instant invention contemplates a fluid collection apparatus for the separation of a mixture including an elongate, thin walled, transparent, hollow body member which is closeable at both ends. A self-sealing septum including a centrally disposed cavity extending axially from one end of the septum and terminating in a normally closed slitted web portion at the opposite end of the septum is disposed at one end of the hollow body. At least a pair of spaced apart inwardly extending ribs are disposed within the cavity. Disposed adjacent the septum is a closure means including a composite piston member having a laterally extending flange portion of a greater diameter than the diameter of the hollow body so that the flange portion extends past the outer edge of the hollow body. A central passageway extends through the body of the composite piston and allows communication with piercing means on the innermost end of the composite piston. A filter element is disposed within the central passageway to effectively prohibit the passage of solid material which is mixed with the fluid fraction in the mixture from passing into the interior space in the hollow body. The apparatus is designed so that prior to actual use the piercing means of the composite piston is held within the septum cavity and adjacent the web by the pair of spaced apart inwardly extending ribs. By maintaining the piercing means adjacent the web before actual use, the elastomeric material of the septum is prohibited from obtaining a compression set in the partially open position due to a penetration by the piercing means. As the collection apparatus is forced into the sample collection tube, the piercing means is forced along the cavity and pierces the slitted web thereby allowing fluid communication from the sample tube to the interior of the hollow body. Thus, the fluid to be collected in the mixture is forced through the filter element contained in the central passageway and is vented via the piercing means to the interior of the hollow body. When sufficient sample has been collected, the path of travel of the collection apparatus is reversed. Upon such reversal, the composite piston assembly detaches itself from the collection apparatus by withdrawing the piercing means through the self-sealing septum and through the inwardly extending ribs and thus the composite piston remains behind in the sample containing tube. The composite piston assembly effectively seals the sample containing tube so that no contaminating material is exposed to the laboratory. The septum contained within the hollow body tightly seals itself upon removal of the piercing means. The tight closing of the septum seals the collected fluid within the hollow body without any possible partial opening of the web due to compression set from the piercing means remaining in the septum for a long period of time. The other end of the hollow body is then sealed by closure means, such as a snap-on cap, to form a shippable, contamination free fluid collection apparatus, according to the present invention.

It is an object of the present invention to provide an apparatus for the collection of fluids in a mixture which is of simple and sturdy design, which can be inserted into a sample containing tube, and which can be withdrawn without contaminating the exterior portion of the apparatus.

Another object of the invention is to provide a self-sealing septum which will tightly seal itself when a piercing means is withdrawn therefrom without any danger of the septum only partially self-sealing due to compression set of the septum material, from the prolonged presence of piercing means therein.

A further object of the present invention is to provide a simple, reliable apparatus which is useful not only for the collection of a sample in a non-contaminated container, but also contains means to seal the sample containing tube and thereby maintain any contaminating or hazardous materials therein.

Another object of the present invention is to provide an apparatus which is very simple in design and composed of minimal parts which can be readily and economically manufactured and assembled.

BRIEF DESCRIPTION OF THE DRAWINGS

The above, as well as other, objects and advantages will become readily apparent to one skilled in the art from reading the following detailed description of the present invention, when considered in light of the accompanying drawings, in which:

FIG. 1 is an exploded sectional perspective view of a fluid collection apparatus embodying the salient features of the present invention;

FIG. 2 is a sectional perspective view of the apparatus illustrated in FIG. 1 in an assembled form prior to actual use;

FIG. 3 is a sectional view of the assembled fluid collection apparatus illustrated in FIGS. 1 and 2 ready for actual use;

FIGS. 4a through 4c illustrate a schematic representation of the apparatus illustrated in FIGS. 1, 2, and 3, in the various stages of operation thereof; and FIG. 5 is an elevational view, partially in section with portions partially cut away of a modified form of the apparatus illustrated in FIGS. 1, 2, 3, 4a, 4b, and 4c.

DETAILED DESCRIPTION OF THE INVENTION

Referring to FIGS. 1, 2, and 3, the present invention is embodied in an apparatus for the collection of a fluid contained in a mixture, usually a liquid and a solid or semisolid. The apparatus is well suited for the separation of blood plasma or serum from the cellular and particulate phase of centrifuged blood. There is shown a fluid collection apparatus 10 having an elongate, thin walled, transparent, hollow body 12. A septum 14 is adapted to be inserted into one end of the hollow body 12. The septum 14 is typically cylindrical in shape and formed of a self-sealing plastic or rubber material. The septum 14 is provided with an internally formed cavity 16 closed at the inner end thereof by a web portion 18. A slit 20 is centrally located in the web portion 18 and extends from the top of the web portion 18 therethrough to the bottom of the web portion 18. A pair of spaced apart inwardly extending annular ribs 22 and 24 are located within the septum cavity 16.

A composite piston 26 is formed to fit into the hollow body 12 and abut the septum 14. The composite piston 26 includes a unitary body 28 having at its outermost face a central passageway 30 which extends through most of the length of the unitary body 28 and terminates with piercing means 32. The piercing means 32 is usually a plastic or steel needle. In the embodiment illustrated in FIGS. 1 to 4c, the piercing means 32 is in the form of a hollow plastic needle which is blunt-nosed at the distal end 34. Two vents 36 and 38 are located along the length of the piercing means 32 immediately below the distal end 34. The vents 36 and 38 allow fluid flow into the hollow body 12 from the exterior of the apparatus 10 when assembled. A filter element 40 is adapted to be disposed within the central passageway 30. The filter element 40 is usually a porous plastic plug which restricts the flow of a solid through the central passageway 30 and piercing means 32 and into the interior of the hollow body 12, but will allow fluid flow through the same path. The outermost end of the composite piston 26 includes a peripherally extending flange 42 which serves to sealingly engage the inner walls of a sample containing tube into which the fluid collection apparatus 10 is inserted, as will be described in detail hereinafter. A snap-on closure 44 is formed to close the uppermost or first end of the hollow body 12 and is removed to employ the apparatus 10.

FIG. 2 illustrates the apparatus 10 of FIG. 1 in assembled form prior to actual use, as it would be for shipment or storage. To assemble the apparatus 10, the snap-on closure 44 is placed on the uppermost or first end of the apparatus 10. The filter element 40 is formed to fit snugly within the central passageway 30 of the composite piston 26. Alternatively, the filter element 40 may be secured in the central passageway 30 with a suitable adhesive. Usually, the piercing means 32 is integral with the unitary body 28 of the composite piston 26. When the piercing means 32 is formed of a plastic material, the entire composite piston 26, except for the filter element 40, can be formed in a single mold in a one step molding operation. Similarly, the septum 14 can be formed in a one step, single mold operation.

After the filter element 40 is placed in the composite piston 26, the apparatus 10 is ready to be completely assembled. The septum 14 is pushed into the lower or second end of the hollow body 12 such a distance that when the flange base 46 contacts the lowermost portion 48 of the hollow body 12, the shoulder 50 of the composite piston 26 will contact the base 52 of the septum 14. The configuration of the base 52 and the shoulder 50 abutting does not occur while the apparatus 10 is in its assembled form prior to actual use, as shown in FIG. 2. Rather, in the prior to actual use configuration, the composite piston 26 is pushed into the hollow tube 12 until the distal end 34 of the piercing means 32 just contacts the web portion 18 of the septum 14. At this point, the uppermost annular rib 22 engages and seals the vents 36 and 38 to prevent fluid entry into the septum cavity 16. The lower annular rib 24 engages the piercing means 32 and aids in holding the composite piston 26 in proper alignment with respect to the septum 14.

FIG. 3 illustrates the configuration of the apparatus 10 when it is in actual use. As seen in FIG. 3, the composite piston 26 is pushed forward so that the piercing means 32 is forced through the slit 20 of the septum 18 and allows access of the vents 36 and 38 to the interior of the hollow body 12. Once the piercing means 32 passes through the slit 20, the ribs 22 and 24 serve to align the composite piston 26 within the septum 14 since there is no longer a need to close the vents 36 and 38.

FIGS. 2 and 3 illustrate that during shipment or storage, for example, the piercing means 32 does not penetrate the slit 20 of the web portion 18. As illustrated in FIG. 3, the piercing means 32 is caused to penetrate the slit 20 only during the period of use. If the piercing means 32 were allowed to remain in the slit 20 of the web portion 18 for an extended period of time, the material of the web portion might be less likely to tightly reseal itself upon the removal of the piercing means 32. This could lead to a leakage of fluid stored on the inside of the hollow body 12 to the outside through the partially unsealed slit 20 of the web portion 18. By maintaining the piercing means 32 just below the web portion 18 preparatory to the actual use thereof and then allowing penetration only for the few seconds necessary to use the apparatus, the user is assured that the web portion 18 will tightly seal itself when the piercing means 32 is withdrawn.

In the embodiment of the invention illustrated in FIGS. 1, 2, and 3, the web portion 18 of the septum 14 is pre-pierced to form the slit 20 to facilitate the insertion of the blunt-nosed plastic needle. Also, the flange 42 is beveled in shape to facilitate insertion of the apparatus 10 into a sample containing tube and to maintain the composite piston 26 in an upright position in the sample containing tube.

FIGS. 4a through 4c illustrate the apparatus in the various stages of operation of the invention illustrated in FIGS. 1, 2, and 3.

FIG. 4a illustrates an assembled fluid collection apparatus 10 having the hollow body 12, the composite piston 26, with its unitary body 28, piercing means 32, flange 42, and filter element 40. The filter 40 is fitted within the central passageway 30 of the composite piston 26. A pair of vents 36 and 38 are near the distal end 34 of the piercing means 32. In the position prior to actual use, as illustrated in FIG. 4a, the spaced apart inwardly extending annular ribs 22 and 24 in a cavity 16 serve to maintain the piercing means 32 within the septum 14. The web portion 18 is disposed at the top of the septum 14 thereby closing the cavity 16 at its uppermost end. A slit 20 is centrally located within the web portion 18. The rib 22 engages and seals the vents 36 and 38 before the apparatus 10 is inserted into an associated sample containing tube 54.

The apparatus 10 is adapted to be inserted into the sample containing tube 54. The sample containing tube 54 is provided with an open end 56, a closed end 58, and a mixture contained therein including a solid fraction 60 and a fluid fraction 62. FIG. 4a illustrates the apparatus 10 disposed immediately above the sample containing tube 54, ready to be inserted therein. As the apparatus 10 is inserted into the sample containing tube 54, the flange 42 of the composite piston 26 engages the inner wall 64 of the open end 56 of the sample containing tube 54. Then, as the apparatus 10 is forced downwardly into the bore of the sample containing tube 54, the composite piston 26 is forced inwardly of the hollow tube 12. The above referred to movement causes the piercing means 32 to move inwardly of the cavity 16, disengaging the vents 36 and 38 from the uppermost rib 22, and causing the distal end 34 of the piercing means 32 to pierce the slit 20. As the apparatus 10 moves further down the sample tube 54, the vents 36 and 38 pass through the slit 20 in the web portion 18 and gain access to the interior of the hollow tube 12. As the bottom of the composite piston 26 passes into the fluid 62, the fluid 62 is forced through the filter element 40 and through the piercing means 32 to be collected as it flows from the vents 36 and 38 on the piercing means 32 and into the interior of the hollow body 12.

After the fluid 62 is collected, as illustrated in FIG. 4b, the path of travel of the apparatus 10 is reversed. The piercing means 32 is withdrawn from the septum 14 due to the flange 42 being securely engaged to the inner wall 64 of the sample containing tube 54. The withdrawal of the hollow body 12 causes the web portion 18 of the septum 14 to automatically seal and thereby form a self-sealed fluid container. The outer surface of the self-sealed fluid container is essentially contamination free due to the fact that no part of the exterior surface of the hollow body 12 or septum 14 has come in contact with any fraction of the solid 60 or fluid 62, either of which may contain a contaminant.

As illustrated in FIG. 4c, after the hollow body 12 and septum 14 portion of the assembly 10 is withdrawn from the sample tube 54, the composite piston 26, due to the flange 42 engaging the inner wall 64 of the sample containing tube 54, remains behind to seal the solid 60 within the sample containing tube 54. The fact that the composite piston 26 remains in the sample containing tube 54 provides a contamination free disposal vessel for the disposal of the solid 60. Many times the solid 60 is a biological material, such as blood solids, which may contain contaminating materials which one would not want to be exposed to in the laboratory.

Another embodiment of the invention is illustrated in FIG. 5. An apparatus 66 embodied in FIG. 5 has an elonage, thin walled, transparent, hollow body 68 which is closed at its uppermost end by a screw type closure 70. The closure 70 is fitted with internal threads to engage external threads on the exterior surface of the uppermost or first end of the hollow body 68. A septum 72 is disposed proximate the lowermost or second end of the hollow body 68. The septum 72 is formed of a self-sealing material, to be described in detail hereinafter. A composite piston 74 is also fitted into the second portion of the hollow body 68. The composite piston 74 includes a unitary body 76 having a central passageway 78 extending therethrough. At the first end of the composite piston 74 is piercing means 80 which is adapted to pierce the septum 72. Communication between the exterior and the interior of the hollow body 68 is provided through the hollow bore 82 of the piercing means 80 and the central passageway 78. The piercing means 80 is usually a metal needle in this embodiment, with a rigid hollow body and an internal hollow bore 82. A filter element 84 is disposed within the central passageway 78 of the composite piston 74, and a flange 85 extends from the unitary body 76. The septum 72 has a centrally located axially extending cavity 86 with a pair of ribs 88 and 90, similar to those illustrated in FIGS. 1 to 4c. The ribs 88 and 90 serve to hold the piercing means 80 in the cavity 86 until the apparatus 66 is inserted into a sample containing tube, as illustrated in FIGS. 4a to 4c.

The embodiment of the invention illustrated in FIG. 5 differs from the invention embodied in FIGS. 1 to 4c in that the closure means 70 at the first end is threaded; the flange 85 is flat; and the piercing means 80 is a stainless steel needle with a single bore 82 functioning as the vent.

In the preferred embodiment illustrated in FIGS. 1 to 4c, and the alternative embodiment of FIG. 5, the hollow body portions are formed of a clear, rigid material, such as plastic or glass. Cellulose acetate butyrate tubes having, for example, an outside diameter of 11 millimeters, an inside diameter of 10 millimeters, and a length of about 100 millimeters have proven satisfactory. The septums are formed of a self-sealing elastomeric material such as silicone rubber. The filter elements are formed of a porous, plastic material which is dimensionally stable and rigid so that it may be formed into a cartridge shape to be inserted into the central passageway.

Generally, a 50 micron average pore size for the filter elements is adequate for use with most samples of biological origin. The pore size of the filter elements may be adjusted with the characteristics of the sample so long as the filter material exhibits the dimensional stability and compatability requirements referred to above.

The composite piston bodies are typically formed of a rigid, dimensionally stable plastic, such as polyethylene. The snap-on closures are typically formed of a plastic material, such as a flexible plastic like vinyl plastisol. When a plastic needle is employed as the piercing means, usually it is formed as an integral part of the unitary body and is thus of the same composition, such as polyethylene.

In the embodiment of the invention illustrated in FIG. 5, the screw type closure 70 is formed of a plastic composition, typically a rigid polyethylene. The piercing means 80 is formed of a metal, such as, for example, stainless steel. All other components are the same as those specified for the preferred embodiment shown in FIGS. 1 to 4c.

The septum 72 in the alternative embodiment shown in FIG. 5 need not be pre-pierced, since the metal needle used can easily pierce the septum 72. Also, it is to be recognized, that, the plastic piercing means 32 need not have two side vents, such as, for example, 36 and 38, one will serve well in the apparatus. The two vent configuration does show the advantage of being more easily molded than does the signle side vent configuration.

In any case, other suitable materials may be used so long as they conform to any standards needed in regard to rigidity, dimensional stability, or chemical inertness to the sample. For example, the snap-on closure 44 is usually made of a flexible vinyl plastisol, but could also be made of a flexible polyethylene should the needs of the user require. Since the apparatus may be readily employed to separate a reaction precipitate from a reaction supernatant fluid, solvent resistant plastic, glass, or metal components may be used where needed.

The apparatus of the invention is well suited to the separation of the liquid or fluid fraction of blood from the solid or semisolid fraction thereof. In such use, the blood to be sampled must be initially subjected to centrifugation. If the apparatus is used with whole blood, some cellular debris or whole cells may pass through the filter element and be collected along with the fluid fraction of the sample. Typically, whole blood is placed in a sample containing tube and centrifuged to precipitate the blood solids from the supernatant fluid. The fluid is plasma, if an anticoagulant is added, and the cellular matter is simply precipitated. The fluid is serum when no anticoagulant is added and a unitary clot is formed as a semisolid precipitate. In either case, the whole blood is typically centrifuged prior to the use of the apparatus.

One important feature of the invention is that, for example, as illustrated in FIGS. 1 to 4c, the septum 14 includes a cavity 16 having the ribs 22 and 24 disposed therein which hold the piercing means 32 adjacent the web portion 18 of the septum 14 until the apparatus 10 is in actual use. Maintaining the piercing means 32 adjacent the web portion 18 prior to actual use prevents any possible leakage of the fluid 62 contained in the hollow tube 12 when the piercing means 32 is removed from the web portion 18 after use. Such leakage would be due to compression set or memory of the web portion 18 while the piercing means 32 was penetrating the web portion 18 for long periods of time before actual use of the apparatus 10, such as, for example, long periods of storage time.

Another important feature of the invention is that essentially only the lowermost face of, for example, the composite piston 26 and the interior surfaces of the closure 44, the hollow body 12, and the septum 14 are exposed to any contamination from the sample. The result is relatively contamination free surfaces for the outer surfaces of the closure 44, the hollow body 12, and the septum 14, and the uppermost portion of the composite piston 26. Therefore, any contaminating matter in the sample is held on the interior of the closure 44, the hollow body 12, and the septum 14, or at the bottom of the sample containing tube which is closed by the composite piston 26 and thereby provides a clean, shippable container for the fluid fraction; and a clean easily disposable container for the solid fraction of the sample.

While a preferred and alternative embodiment of the present invention has been illustrated and described, it is understood that various modifications may be resorted to without departing from the scope of the appended claims.

What I claim is:

1. A fluid collection apparatus for the separation of a mixture comprising:
    an elongate, transparent, hollow body having a first and a second open end;
    closure means for said first end of said body;
    a self-sealing septum sealingly disposed within said body adjacent the second end, said septum including a centrally disposed cavity extending axially from one end thereof and terminating in a normally closed slitted web portion at the opposite end thereof, and at least a pair of spaced apart inwardly extending ribs in said cavity; and
    a composite piston adapted to be inserted into the second end of said hollow body, said composite piston including a unitary body having a central passageway therethrough, hollow piercing means adapted to pierce said slitted web portion of said septum and provide communication between said central passageway and the interior of said hollow body, a filter element disposed within said central passageway, and a laterally extending flange extending beyond the outer wall of said hollow body whereby when said apparatus is inserted into a sample containing tube, said piercing means is caused to pierce said slitted web portion of said septum to allow a filtrate to pass through said filter element through said hollow piercing means and into the interior of said hollow body, such that when said apparatus is withdrawn from the sample containing tube said flange maintains said composite piston in the sample containing tube, and allows said web to seal when said piercing means is removed therefrom.

2. The apparatus defined in claim 1 wherein said piercing means includes at least one laterally disposed aperture means.

3. The apparatus defined in claim 2 wherein at least one of said ribs is selectively engageable with the aperture means of said piercing means.

4. The apparatus defined in claim 1 wherein said hollow body is fabricated of a plastic material.

5. The apparatus defined in claim 4 wherein said plastic is cellulose acetate butyrate.

6. The apparatus defined in claim 1 wherein said self-sealing septum is fabricated of silicone rubber.

7. The apparatus defined in claim 1 wherein said unitary body of said composite piston is fabricated of a plastic material.

8. The apparatus defined in claim 7 wherein said plastic is polyethylene.

9. The apparatus defined in claim 1 wherein said filter element is fabricated of a plastic material.

10. The apparatus defined in claim 9 wherein said plastic is a porous plastic.

11. The apparatus defined in claim 1 wherein said piercing means is a hollow needle.

12. The apparatus defined in claim 11 wherein said needle is fabricated of a plastic material.

13. The apparatus defined in claim 11 wherein said needle is fabricated of a metal material.

14. The apparatus defined in claim 1 wherein said hollow body is a right circular cylinder.

15. The apparatus defined in claim 14 wherein said composite piston is a right circular cylinder.

* * * * *